United States Patent
Dankow et al.

(10) Patent No.: US 6,601,836 B1
(45) Date of Patent: Aug. 5, 2003

(54) LEAF SPRING EYE WRAP SCARF GAP COVER COMPONENT

(75) Inventors: Mark William Dankow, Fort Wayne, IN (US); Lynn Lash, Avilla, IN (US); Christopher W. Forrest, Aubrun, IN (US); Raymond A. Hewitt, Stratford (CA)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 09/634,033

(22) Filed: Aug. 8, 2000

(51) Int. Cl.[7] .................................................. F16F 1/28
(52) U.S. Cl. ........................................ 267/271; 267/268
(58) Field of Search ................................. 267/260, 271, 267/268, 262, 239, 148, 149

(56) References Cited

U.S. PATENT DOCUMENTS

| | | | |
|---|---|---|---|
| 787,288 A | * | 4/1905 | Geibel ............................. 65/78 |
| 1,684,724 A | * | 9/1928 | Blomgren .................... 267/270 |
| 2,099,942 A | * | 11/1937 | Porter ......................... 267/271 |
| 2,152,388 A | * | 3/1939 | Porter ......................... 267/271 |
| 2,467,548 A | * | 4/1949 | Bradley ....................... 403/227 |
| 2,771,312 A | * | 11/1956 | Thiry .......................... 403/163 |
| 2,905,460 A | | 9/1959 | Van Winsen |
| 3,645,522 A | | 2/1972 | Rowland |
| 3,841,655 A | | 10/1974 | Schaeff |
| 3,921,965 A | | 11/1975 | Skerry |
| 4,691,937 A | | 9/1987 | Raidel |
| 5,083,477 A | * | 1/1992 | Geil ............................... 74/553 |
| 5,820,115 A | * | 10/1998 | Stevenson et al. ........... 267/293 |

* cited by examiner

Primary Examiner—Christopher P. Schwartz
Assistant Examiner—Xuan Lan Nguyen
(74) Attorney, Agent, or Firm—Cook, Alex, McFarron, Manzo, Cummings & Mehler, Ltd.

(57) ABSTRACT

A suspension system component for use in association with a leaf spring eye wrap of a leaf spring is shown to include a generally rigid planar base portion and a generally rigid scarf gap cover portion extending from the base portion in a direction generally normal to the base portion. The scarf gap cover portion includes first and second cover portion portions extending in different planes and adjoined at a seam. The component further includes a generally rigid first stop portion formed as a peg-like structure extending from the base portion in the same direction as the scarf gap cover portion. The component also includes a generally rigid second stop portion formed as a curved engagement surface extending from the base portion in that same direction. When installed in a leaf spring eye wrap, the component covers the scarf gap formed by the end of the eye wrap and provides a protective barrier between a sleeveless bushing installed in that eye wrap and the scarf gap for allowing connection of the leaf spring to a pivot point established by a frame hanger mounted on a frame rail.

84 Claims, 1 Drawing Sheet

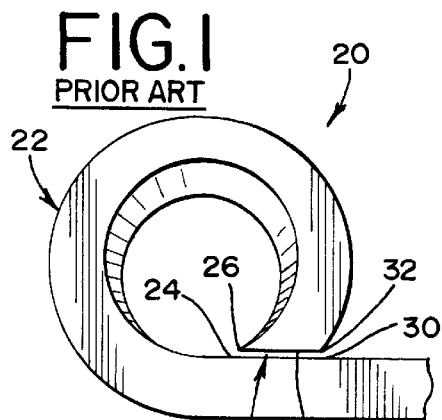
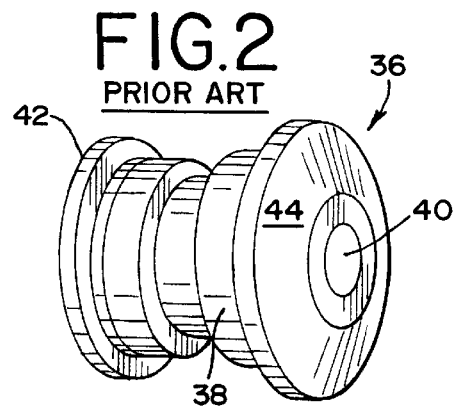
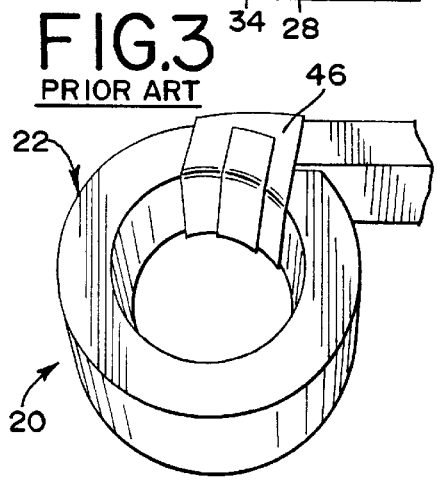
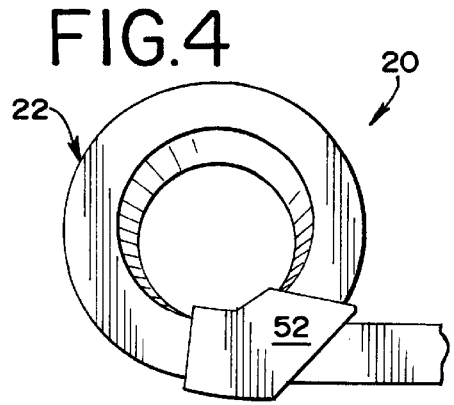
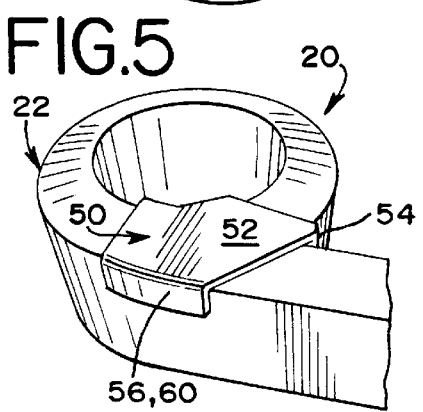
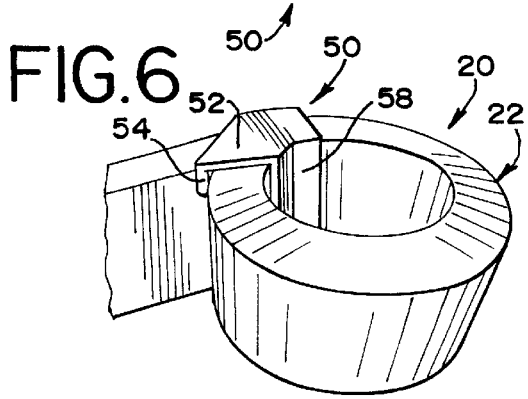
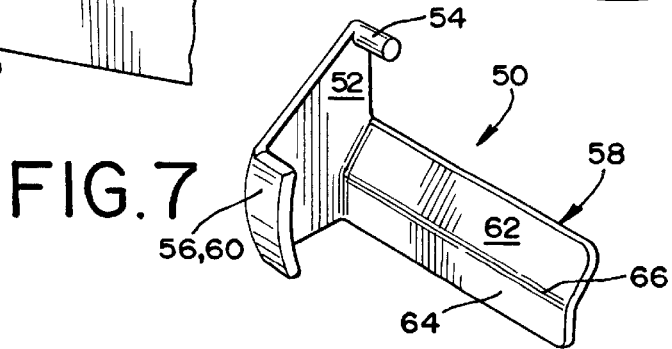

LEAF SPRING EYE WRAP SCARF GAP COVER COMPONENT

FIELD OF THE INVENTION

The present invention relates generally to vehicle suspension system components and more particularly to a new component used in association with a leaf spring of the type typically included in vehicle suspension systems.

BACKGROUND OF THE INVENTION

Leaf springs are components used in a variety of vehicle suspension systems. As an example, leaf springs are used on most heavy-duty truck suspensions as a component thereof. Leaf springs are used to support the load of the vehicle and typically connect at opposite ends of the conventional C-shaped frame rail extending longitudinally on one side of the vehicle. Typically, a similar spring is incorporated for connection with the C-shaped frame rail positioned on the opposite side of the vehicle. The leaf springs are connected to the rails through frame hangers at pivot points that control the articulation of the suspension.

Leaf springs ordinarily connect to the frame rails at their opposing ends by way of an end wrap, or eye, of the leaf spring that accepts a bushing adapted to permit such fastening. Traditionally, leaf spring bushings include a rubber core that is confined by an outer metal sleeve. Such bushings conventionally have three layers, including an inner metal sleeve. The bushings are typically installed or assembled into each eye located at opposite ends of the leaf spring to permit connection with the frame hangers.

Use of traditional bushings having an outer metal sleeve to connect the leaf springs to the frame hangers has at least two notable drawbacks. First, the cost associated with manufacture and assembly of the bushing increases when an outer metal sleeve is incorporated therein. Second, bushings having an outer metal sleeve typically do not fit as well within the eye of the leaf spring in that the generally perfectly round outer metal "rocks" within the inconsistent inner diameter of the leaf spring eye wrap. In an extreme case, the rocking action of the bushing during leaf spring deflection resulting from suspension system articulation can cause the bushing to walk out of the leaf spring eye wrap, creating hazardous conditions.

These drawbacks associated with use of traditional bushings having an outer metal sleeve have led to the development of a sleeveless bushing. Sleeveless bushings eliminate the outer metal sleeve and thereby reduce the costs associated with the manufacture and assembly of the bushings. Further, sleeveless bushings provide for a consistent fit within the leaf spring eye wrap as they are permitted to flow within the wrap to achieve the desired confinement required for adequate fatigue resistance.

One foreseeable drawback of sleeveless bushings for use within leaf spring eye wraps is attributed to the construction of conventional leaf spring eye wraps. FIG. 1 illustrates an end of a leaf spring 20 of the type typically used in vehicle suspension systems. As shown, the end of the leaf spring includes an eye wrap 22 that is formed by encircling the end of the leaf spring back onto itself.

The eye wrap 22 is generally circular, but typically not perfectly circular, and includes an inner diameter and an outer diameter radially spaced from each other by the thickness of leaf spring 20 at its end. The inner diameter of leaf spring 20 can be defined as beginning at an inner diameter beginning line 24, extending along the top surface of leaf spring 20, and ending at an inner diameter end line 26 positioned on the top surface of the leaf spring and coincident with one boundary of leaf spring end 28. The inner diameter is defined entirely by the top surface of leaf spring 20. The outer diameter of leaf spring 20 can be defined as beginning at an outer diameter beginning line 30 positioned on the top surface of the leaf spring, extending across the thickness of leaf spring 20 and along the bottom surface of the leaf spring up to and including an outer diameter end line 32 positioned on the bottom surface of the leaf spring and coincident with a boundary of leaf spring end 28.

As shown, a gap 34, referred to as a scarf gap by those skilled in the art, is included in the construction of a conventional leaf spring used in suspension systems. Gap 34 is defined by the space between the end 28 of leaf spring 20 and that portion of the top surface of the leaf spring closely positioned in opposed relationship thereto. In particular, the gap 34 is bounded by inner diameter beginning point 24, inner diameter end line 26, outer diameter end line 32 and outer diameter beginning line 30.

Because the inner diameter of leaf spring 20 is not entirely continuous but rather includes gap 34, a sharp edge that presents a potential problem for the use of sleeveless bushings is formed at inner diameter end line 26. With traditional bushings, the outer metal sleeve protects the rubber inner or middle core from being torn during assembly and worn during suspension articulation. Accordingly, no additional barrier need be placed between the scarf gap and the bushing when a traditional bushing having an outer metal sleeve is installed or assembled in the leaf spring eye wrap.

With sleeveless bushings, however, the sharp edge can tear the unprotected rubber body of the bushing during installation within the leaf spring eye wrap and also wear down the bushing during suspension articulation.

FIG. 2 illustrates a sleeveless bushing 36 having an elastomeric body 38 and a bore 40 extending longitudinally through it. As shown, sleeveless bushing 36 includes opposing end flange portions 42, 44 for providing a proper fit within the eye wrap 22 of leaf spring 20 (FIG. 1) and for preventing walking out during leaf spring deflection. In the illustrated embodiment, sleeveless bushing 36 has a spool-like shape.

In the past, to prevent the wear caused by a scarf gap on a sleeveless bushing during suspension articulation, fiber-reinforced tape in combination with an electrical tape has been used to cover the scarf gap and thereby protect the bushing. Until the present invention, the only alternative has been to leave the bushing unprotected and sacrifice its field life.

FIG. 3 illustrates the former method. As shown, a tape combination 46, which includes fiber-reinforced tape in combination with electrical tape, covers the sharp edge created by the gap 34 (see FIG. 1) positioned at the end of the leaf spring eye wrap 22. Although this method is more desirable than leaving the elastomeric body 38 of a sleeveless bushing 36 (FIG. 2) unprotected, it has considerable drawbacks. Among others, using tape, such as tape combination 46, to cover the scarf gap is an inefficient method of manufacture. Preparing the scarf gap with tape is an arduous task. Also, the tape itself ordinarily wears as a result of suspension articulation, resulting in the sleeveless bushing being effectively left without protection from the scarf gap.

In light of the foregoing, it is desirable to design a suspension system component that will provide a barrier between the scarf gap formed by a leaf spring eye wrap and a sleeveless bushing assembled therein to provide a method of fastening the leaf spring to a conventional frame hanger.

It is also desirable to design a suspension system component that minimizes the risk of tearing sleeveless bushings when such bushings are assembled in the leaf spring eye wrap of a suspension system leaf spring.

It is still yet desirable to design a suspension system component that minimizes the risk of wearing sleeveless bushings assembled in the leaf spring eye wrap of a suspension system leaf spring during deflection of the leaf spring.

It is further desirable to design a suspension system component that enables use of a sleeveless bushing that replaces traditional bushings having an outer metal sleeve, thereby reducing the cost associated with the suspension system.

It is yet further desirable to design a suspension system component that provides for an effective method of manufacture and eliminates the arduous task of preparing the scarf gap of a leaf spring eye wrap with tape when a sleeveless bushing is used to connect the leaf spring to a frame hanger.

It is still yet desirable to provide a suspension system component that increases the field life of sleeveless bushings installed within the eye wrap of a suspension system leaf spring.

It is still further desirable to provide a suspension system component having a design that is robust enough to withstand assembly misuse and multiple re-bushes.

These and other objects of the preferred form of the invention will become apparent from the following description. It will be understood, however, that an apparatus could still appropriate the invention claimed herein without accomplishing each and every one of these objects, including those gleaned from the following description. The appended claims, not the objects, define the subject matter of this invention. Any and all objects are derived from the preferred form of the invention, not necessarily the invention in general.

SUMMARY OF THE INVENTION

The present invention relates to a suspension system component for use in association with a leaf spring eye wrap of a leaf spring. In its preferred form, among other things, the suspension system component includes a generally rigid planar base portion and a generally rigid scarf gap cover portion extending from the base portion in a direction generally normal to the base portion. The scarf gap cover portion includes first and second cover portion portions extending in different planes and adjoined at a seam. The component further includes a generally rigid first stop portion formed as a peg-like structure extending from the base portion in the same direction as the scarf gap cover portion. The component also includes a generally rigid second stop portion formed as a curved engagement surface extending from the base portion in that same direction.

BRIEF DESCRIPTION OF THE DRAWINGS

In the detailed description, including the foregoing description, reference has and will frequently be made to the following drawings, in which like reference numerals referred to like components, and in which:

FIG. 1 is a side elevational view of one end of a conventional leaf spring of the type used in vehicle suspension systems;

FIG. 2 is a perspective view of a conventional sleeveless bushing that can be installed in the leaf spring eye wrap of a leaf spring such as the type shown in FIG. 1;

FIG. 3 is top perspective view of the leaf spring end shown in FIG. 1, further showing a tape combination covering the scarf gap formed at the end of the leaf spring eye wrap;

FIG. 4 is a side elevational view of a leaf spring eye wrap incorporating a novel suspension system component constructed in accordance with the principles of the present invention;

FIG. 5 is a bottom perspective view of the leaf spring eye wrap shown in FIG. 4 incorporating a novel suspension system component constructed in accordance with the principles of the present invention;

FIG. 6 is a perspective view showing the inner diameter of the leaf spring eye wrap shown in FIG. 4 incorporating a novel suspension system component constructed in accordance with the principles of the present convention; and FIG. 7 is a perspective view of a novel suspension system component constructed in accordance with the principles of the present invention.

DETAILED DESCRIPTION OF THE PREFERRED EMBODIMENT

FIGS. 4–7 illustrate a suspension system component generally identified by reference numeral 50. In FIGS. 4–6, component 50 is shown as being installed within and connected to a leaf spring eye wrap 22. In FIG. 8, component 50 is shown alone.

As shown best in FIG. 7, component 50 includes a base portion 52 having a stop portion 54, a stop portion 56 and a scarf gap cover portion 58 extending therefrom. In its preferred form, as shown, base portion 52 is generally planar.

Stop portion 54 preferably extends generally normally from base portion 52. In its preferred form, stop portion 54 is embodied as a peg-like structure. When component 50 is installed within a leaf spring eye wrap, stop portion 54 prevents component 50 from rotating beyond a negligible distance during articulation of the suspension system by bearing against leaf spring 20.

Stop portion 56 also preferably extends generally normally from base portion 52. In its preferred form, stop portion 56 is embodied as an engagement surface 60. As desired, engagement surface 60 preferably has a curvature similar to that of the bottom surface of a leaf spring in which it contacts so that it accommodates that surface. Stop portion 56 provides a bearing surface and restricts rotation of component 50 with respect to its associated leaf spring wrap during articulation of the suspension system.

Scarf gap cover portion 58 covers the scarf gap when component 50 is installed within leaf spring eye wrap 22. In its preferred form, scarf gap cover portion 58 includes two adjacent surface portions 62, 64 extending in different planes that are joined longitudinally by a seam 66. Scarf gap cover portion 58 is preferably positioned coincident with the scarf gap of the leaf spring eye wrap 22 and covers same when component 50 is installed within that eye wrap.

As best shown in FIGS. 4–6, when installed within leaf spring eye wrap 22, component 50 contacts the leaf spring eye wrap at three distinct contact points: the bottom of the leaf (stop portion 56), the opposite side of the scarf gap (stop portion 54) and the inner diameter of the leaf spring eye wrap (scarf gap cover portion 58). By contacting the leaf spring eye wrap as such, component 50 is prevented from rotating during suspension articulation. This prevention of rotation during suspension articulation maintains the position of component 50 when it is installed within the leaf spring eye wrap. If not for this maintenance of position, the component 50 might move away from a position wherein it covers the scarf gap of the leaf spring eye wrap and the sleeveless bushing would be exposed to that gap, causing wear during leaf spring deflection.

As further shown, component 50 is constructed preferably such that it can be snap-fitted or clipped into the leaf spring eye wrap during assembly/installation. Component 50 is preferably constructed of a rigid, untearable material, unlike the tape used in the prior art. This allows component 50 to withstand considerable fatigue stress during suspension operation. In its most preferred form, component 50 is molded in a single, unitary piece, resulting in low-cost manufacture. Any suitable material can be used for component 50. Preferably, component 50 is made from a synthetic or natural polymer. This also provides for a relatively lightweight component, which in the case of use in suspension systems for commercial vehicles, translates into greater payload capacity.

Although it will be recognized by those skilled in the art that component 50 can be used in suspension systems of all types that incorporate leaf springs, it is particularly suited for use in suspension systems for heavy-duty commercial trucks. Ordinarily, two components resembling component 50 will be used per axle suspension, totaling four per vehicle axle.

While this invention has been described with reference to an illustrative embodiment, it will be understood that this description shall not be construed in a limiting sense. Rather, various changes and modifications can be made to the illustrative embodiment without departing from the true spirit and scope of the invention, as defined by the following claims. Furthermore, it will be appreciated that any such changes and modifications would be recognized by those skilled in the art as an equivalent to one element or more of the following claims, and shall be covered by such claims to the fullest extent permitted by law.

What is claimed is:

1. A suspension system component for use in association with a leaf spring eye wrap of a leaf spring, the leaf spring eye wrap having an inner diameter and an outer diameter and further forming a sharp edge at a scarf gap of the leaf spring eye wrap positioned along the inner diameter thereof, said suspension component comprising:
    a generally rigid base portion constructed to be positioned outside said inner diameter of said leaf spring eye wrap and to extend radially outwardly from said inner diameter of said leaf spring eye wrap when said component is installed in said leaf spring eye wrap; and
    a generally rigid scarf gap cover portion extending from said base portion constructed to cover said sharp edge of said leaf spring eye wrap when said component is installed in said leaf spring eye wrap.

2. The suspension system component of claim 1 wherein said base portion and said scarf gap cover portion are included within a unitary structure.

3. The suspension system component of claim 1 wherein said generally rigid base portion is generally planar.

4. The suspension system component of claim 3 wherein said scarf gap cover portion extends in a direction generally normal from said base portion.

5. The suspension system component of claim 1 further comprising a generally rigid stop portion extending from said base portion.

6. The suspension system component of claim 5 wherein said generally rigid stop portion extends in a direction generally normal from said base portion.

7. The suspension system component of claim 5 wherein said generally rigid stop portion forms a peg-like structure.

8. The suspension system component of claim 5 wherein said generally rigid stop portion forms an engagement surface.

9. A suspension system component for use in association with a leaf spring eye wrap of a leaf spring, the leaf spring eye wrap having an inner diameter and an outer diameter, comprising:
    a generally rigid base portion constructed to be positioned outside said inner diameter of said leaf spring eye wrap and to extend radially outwardly from said inner diameter of said leaf spring eye wrap when said component is installed in said leaf spring eye wrap; and
    a generally rigid scarf gap cover portion extending from said base portion;
    a generally rigid stop portion extending from said base portion;
    wherein said generally rigid stop portion forms an engagement surface; and
    wherein said engagement surface is a curved surface.

10. The suspension system component of claim 5 wherein said base portion, said scarf gap cover portion and said stop portion are included within a unitary structure.

11. The suspension system component of claim 5 further comprising another generally rigid stop portion extending from said base portion.

12. The suspension system component of claim 11 wherein said another generally rigid stop portion extends in a direction generally normal from said base portion.

13. The suspension system component of claim 11 wherein said another generally rigid stop portion forms a peg-like structure.

14. The suspension system component of claim 13 wherein said generally rigid stop portion forms an engagement surface.

15. The suspension system component of claim 11 wherein said another generally rigid stop portion forms an engagement surface.

16. The suspension system component of claim 15 wherein said engagement surface is a curved surface.

17. The suspension system component of claim 11 wherein said base portion, said scarf gap cover portion and said generally rigid stop portion are included within a unitary structure.

18. The suspension system component of claim 1 wherein said component is made from a polymer.

19. A suspension system component for use in association with a leaf spring eye wrap of a leaf spring, the leaf spring eye wrap having an inner diameter and an outer diameter, said suspension component comprising:
    a generally rigid base portion;
    a generally rigid scarf gap cover portion extending from said base portion;
    a generally rigid first stop portion extending from said base portion and constructed to contact said leaf spring eye wrap at said outer diameter thereof when said suspension component is installed in said leaf spring eye wrap; and
    a generally rigid second stop portion extending from said base portion.

20. The suspension system component of claim 19 wherein said base portion is generally planar, and said scarf gap cover portion, said first stop portion and said second stop portion extend from said base portion in a direction generally normal to said base portion.

21. The suspension system component of claim 19 wherein said scarf gap cover portion includes two portions extending in different planes and adjoined at a seam.

22. The suspension system of claim 21 wherein said seam extends in a direction generally normal to said base portion.

23. A suspension system component for use in association with a leaf spring eye wrap of a leaf spring, the leaf spring eye wrap having an inner diameter and an outer diameter, said suspension component comprising:
- a generally rigid planar base portion;
- a generally rigid scarf gap cover portion extending from said base portion in a direction generally normal to said base portion, said scarf gap cover portion including first and second cover portion portions extending in different planes and adjoined at a seam;
- a generally rigid first stop portion formed as a peg-like structure extending from said base portion in said direction; and
- a generally rigid second stop portion formed as a curved engagement surface extending from said base portion in said direction and constructed to contact said leaf spring eye wrap at said outer diameter thereof when said suspension component is installed in said leaf spring eye wrap.

24. The suspension system component of claim 23 wherein said component forms a unitary structure.

25. The suspension system component of claim 23 wherein said component is made from a polymer.

26. The suspension system component of claim 25 wherein said polymer is a synthetic polymer.

27. An assembly installed within a leaf spring eye wrap of a leaf spring, said leaf spring eye wrap having and inner diameter and an outer diameter, and further having a sharp edge formed at a scarf gap of the leaf spring eye wrap and positioned along the inner diameter thereof, said assembly comprising:
- a sleeveless bushing installed within said inner diameter of said leaf spring eye wrap; and
- a component separate from said sleeveless bushing having a generally rigid base portion and a generally rigid scarf gap cover portion extending from said base portion and positioned between said sleeveless bushing and said sharp edge of said leaf spring eye wrap.

28. The assembly of claim 27 wherein said base portion and said scarf gap cover portion are included within a unitary structure.

29. The assembly of claim 27 wherein said generally rigid base portion is generally planar.

30. The assembly of claim 27 said scarf gap cover portion extends in a direction generally normal from said base portion.

31. The assembly of claim 27 wherein said component further comprises a generally rigid stop portion extending from said base portion.

32. The assembly of claim 31 wherein said generally rigid stop portion extends in a direction generally normal from said base portion.

33. The assembly of claim 31 wherein said generally rigid stop portion forms a peg-like structure.

34. The assembly of claim 31 wherein said generally rigid stop portion forms an engagement surface.

35. The assembly of claim 34 wherein said engagement surface is a curved surface.

36. The assembly of claim 31 wherein said base portion, said scarf gap cover portion and said stop portion are included within a unitary structure.

37. The assembly of claim 31 wherein said component further comprises another generally rigid stop portion extending from said base portion.

38. The assembly of claim 37 wherein said another generally rigid stop portion extends in a direction generally normal from said base portion.

39. The assembly of claim 37 wherein said another generally rigid stop portion forms a peg-like structure.

40. The assembly of claim 39 wherein said generally rigid stop portion forms an engagement surface.

41. The assembly of claim 37 wherein said another generally rigid stop portion forms an engagement surface.

42. The assembly of claim 41 wherein said engagement surface is a curved surface.

43. The assembly of claim 37 wherein said base portion, said scarf gap cover portion and said stop portion are included within a unitary structure.

44. The assembly of claim 27 wherein said component is made from a polymer.

45. The assembly of claim 27 wherein said generally rigid base portion is positioned outside said inner diameter of said leaf spring eye wrap.

46. The assembly of claim 31 wherein said generally rigid stop portion contacts said leaf spring eye wrap at said outer diameter thereof.

47. The assembly of claim 37 wherein said generally rigid stop portion contacts said leaf spring eye wrap at said outer diameter thereof.

48. The assembly of claim 47 wherein said another generally rigid stop portion contacts said leaf spring eye wrap at said outer diameter thereof.

49. A suspension system component for use in association with a leaf spring eye wrap of a leaf spring, the leaf spring eye wrap having an inner diameter and an outer diameter and further forming a sharp edge at a scarf gap of the leaf spring eye wrap positioned along the inner diameter thereof, said suspension component comprising:
- a generally rigid base portion constructed to be positioned outside said inner diameter of said leaf spring eye wrap and to extend from said inner diameter toward the outer diameter of said leaf spring eye wrap when said component is installed in said leaf spring eye wrap; and
- a generally rigid scarf gap cover portion extending from said base portion constructed to cover said sharp edge of said leaf spring eye wrap when said component is installed in said leaf spring eye wrap.

50. The suspension system component of claim 49 wherein said base portion and said scarf gap cover portion are included within a unitary structure.

51. The suspension system component of claim 49 wherein said generally rigid base portion is generally planar.

52. The suspension system component of claim 51 wherein said scarf gap cover portion extends in a direction generally normal from said base portion.

53. The suspension system component of claim 49 further comprising a generally rigid stop portion extending from said base portion.

54. The suspension system component of claim 53 wherein said generally rigid stop portion extends in a direction generally normal from said base portion.

55. The suspension system component of claim 53 wherein said generally rigid stop portion forms a peg-like structure.

56. The suspension system component of claim 53 wherein said generally rigid stop portion forms an engagement surface.

57. The suspension system component of claim 53 wherein said base portion, said scarf gap cover portion and said stop portion are included within a unitary structure.

58. The suspension system component of claim 53 further comprising another generally rigid stop portion extending from said base portion.

59. The suspension system component of claim 58 wherein said another generally rigid stop portion extends in a direction generally normal from said base portion.

60. The suspension system component of claim 58 wherein said another generally rigid stop portion forms a peg-like structure.

61. The suspension system component of claim 60 wherein said generally rigid stop portion forms an engagement surface.

62. The suspension system component of claim 58 wherein said another generally rigid stop portion forms an engagement surface.

63. The suspension system component of claim 62 wherein said engagement surface is a curved surface.

64. The suspension system component of claim 58 wherein said base portion, said scarf gap cover portion and said generally rigid stop portion are included within a unitary structure.

65. The suspension system component of claim 49 wherein said component is made from a polymer.

66. A suspension system component for use in association with a leaf spring eye wrap of a leaf spring, the leaf spring eye wrap having an inner diameter and an outer diameter, comprising:
- a generally rigid base portion constructed to be positioned outside the inner diameter of said leaf spring eye wrap and to extend from said inner diameter toward the outer diameter of said leaf spring eye wrap when said component is installed in said leaf spring eye wrap;
- a generally rigid scarf gap cover portion extending from said base portion;
- a generally rigid stop portion extending from said base portion;
- wherein said generally rigid stop portion forms an engagement surface; and
- wherein said engagement surface is a curved surface.

67. A suspension system component for use in association with a bushing and a leaf spring eye wrap of a leaf spring, the leaf spring eye wrap having an inner diameter and an outer diameter and further forming a sharp edge at a scarf gap of the leaf spring eye wrap positioned along the inner diameter thereof, said suspension component comprising:
- a generally rigid base portion constructed to be positioned outside said inner diameter of said leaf spring eye wrap when said component is installed in said leaf spring eye wrap; and
- a generally rigid scarf gap cover portion extending from said base portion to be positioned between said bushing and said sharp edge of said leaf spring eye wrap to cover said sharp edge of said leaf spring eye wrap when said component is installed in said leaf spring eye wrap.

68. The suspension system component of claim 67 wherein said base portion and said scarf gap cover portion are included within a unitary structure.

69. The suspension system component of claim 67 wherein said generally rigid base portion is generally planar.

70. The suspension system component of claim 69 wherein said scarf gap cover portion extends in a direction generally normal from said base portion.

71. The suspension system component of claim 67 further comprising a generally rigid stop portion extending from said base portion.

72. The suspension system component of claim 71 wherein said generally rigid stop portion extends in a direction generally normal from said base portion.

73. The suspension system component of claim 71 wherein said generally rigid stop portion forms a peg-like structure.

74. The suspension system component of claim 71 wherein said generally rigid stop portion forms an engagement surface.

75. The suspension system component of claim 71 wherein said base portion, said scarf gap cover portion and said stop portion are included within a unitary structure.

76. The suspension system component of claim 71 further comprising another generally rigid stop portion extending from said base portion.

77. The suspension system component of claim 76 wherein said another generally rigid stop portion extends in a direction generally normal from said base portion.

78. The suspension system component of claim 76 wherein said another generally rigid stop portion forms a peg-like structure.

79. The suspension system component of claim 78 wherein said generally rigid stop portion forms an engagement surface.

80. The suspension system component of claim 76 wherein said another generally rigid stop portion forms an engagement surface.

81. The suspension system component of claim 80 wherein said engagement surface is a curved surface.

82. The suspension system component of claim 76 wherein said base portion, said scarf gap cover portion and said generally rigid stop portion are included within a unitary structure.

83. The suspension system component of claim 67 wherein said component is made from a polymer.

84. A suspension system component for use in association with a bushing and a leaf spring eye wrap of a leaf spring, the leaf spring eye wrap forming a sharp edge at a scarf gap of the leaf spring eye wrap, comprising:
- a generally rigid base portion;
- a generally rigid scarf gap cover portion extending from said base portion to be positioned between said bushing and said sharp edge at said scarf gap of said leaf spring eye wrap to cover said sharp edge of said leaf spring eye wrap when said component is installed in said leaf spring eye wrap;
- a generally rigid stop portion extending from said base portion;
- wherein said generally rigid stop portion forms an engagement surface; and
- wherein said engagement surface is a curved surface.

* * * * *